United States Patent
Krajnc (10) Patent No.: US 11,950,346 B2
(45) Date of Patent: Apr. 2, 2024

(54) CONFIGURING A BRIDGE WITH GROUPS AFTER ADDITION OF SAID BRIDGE TO A LIGHTING SYSTEM

(71) Applicant: SIGNIFY HOLDING B.V., Eindhoven (NL)

(72) Inventor: Hugo José Krajnc, Eindhoven (NL)

(73) Assignee: SIGNIFY HOLDING, B.V., Einhoven (NL)

( * ) Notice: Subject to any disclaimer, the term of this patent is extended or adjusted under 35 U.S.C. 154(b) by 154 days.

(21) Appl. No.: 17/771,983

(22) PCT Filed: Oct. 23, 2020

(86) PCT No.: PCT/EP2020/079928
§ 371 (c)(1),
(2) Date: Apr. 26, 2022

(87) PCT Pub. No.: WO2021/089348
PCT Pub. Date: May 14, 2021

(65) Prior Publication Data
US 2022/0377868 A1    Nov. 24, 2022

(30) Foreign Application Priority Data
Nov. 4, 2019    (EP) .................................... 19206805

(51) Int. Cl.
*H05B 47/19*    (2020.01)

(52) U.S. Cl.
CPC .................................. *H05B 47/19* (2020.01)

(58) Field of Classification Search
CPC .... H05B 47/19; H05B 47/105; H05B 47/115; H05B 47/125; H05B 47/13; H05B 47/195; H04W 84/12; H04W 84/18; H04W 88/06; Y02B 20/40
USPC .......................................................... 315/294
See application file for complete search history.

(56) References Cited

U.S. PATENT DOCUMENTS

| | | | | |
|---|---|---|---|---|
| 9,655,217 | B2* | 5/2017 | Recker | H05B 47/16 |
| 2016/0073482 | A1* | 3/2016 | Fok | H05B 47/19 |
| | | | | 315/294 |
| 2017/0135174 | A1* | 5/2017 | Aliakseyeu | H05B 47/19 |
| 2019/0116635 | A1* | 4/2019 | Wilson | H05B 45/10 |
| 2019/0116645 | A1* | 4/2019 | Tiberi | H05B 47/115 |

FOREIGN PATENT DOCUMENTS

WO    2018206378 A1    11/2018

* cited by examiner

*Primary Examiner* — Ryan Jager

(57) ABSTRACT

A system (1) for configuring a bridge (13) in a wireless lighting system (31), which has been commissioned, is configured to determine that a bridge has been added to the wireless lighting system. The wireless lighting system comprises a plurality of lighting devices (14-19). The system is further configured to obtain information relating to the plurality of lighting devices, analyze the information, and determine one or more groups of lighting devices based on the analysis. At least one of the one or more groups comprises multiple of the plurality of lighting devices. The system is further configured to configure the bridge with the determined one or more groups upon determining that the bridge has been added to the wireless lighting system.

14 Claims, 4 Drawing Sheets

CONFIGURING A BRIDGE WITH GROUPS AFTER ADDITION OF SAID BRIDGE TO A LIGHTING SYSTEM

CROSS-REFERENCE TO PRIOR APPLICATIONS

This application is the U.S. National Phase application under 35 U.S.C. § 371 of International Application No. PCT/EP2020/079928, filed on Oct. 23, 2020, which claims the benefit of European Patent Application No. 19206805.4, filed on Nov. 4, 2019. These applications are hereby incorporated by reference herein.

FIELD OF THE INVENTION

The invention relates to a system for configuring a bridge in a wireless lighting system which has been commissioned, said wireless lighting system comprising a plurality of lighting devices.

The invention further relates to a method of configuring a bridge in a wireless lighting system which has been commissioned, said wireless lighting system comprising a plurality of lighting devices.

The invention also relates to a computer program product enabling a computer system to perform such a method.

BACKGROUND OF THE INVENTION

Certain wireless lighting systems allow mobile devices to control them directly, typically with direct short-range connections like Bluetooth connections. Such a wireless lighting system is referred to as a standalone system in this specification. An advantage of such a system is that it is less expensive or perceived as less complex by the user. A drawback of such a system is that a user is most likely not be able to control lights in rooms other than the one he is in. Another drawback of such a system is that there is no central device (locally in the home or remotely in the cloud) that can coordinate actions if the mobile device is not in range.

Certain other wireless lighting systems require a bridge to control lighting devices with a mobile device (bridge-based lighting systems). Such a bridge typically uses Wi-Fi or Ethernet to connect to a Wi-Fi access point for enabling the user to control the wireless lighting system via an app and uses (e.g. Zigbee) mesh network technology to enable communication between two nodes of the wireless lighting system via one or more other nodes of the wireless lighting system and thereby increase coverage. Each of these two types systems has its advantages. The advantage of using a bridge is that it allows lighting devices to be controlled in groups. Standalone systems normally do not support groups due to range limitations and the limited number of devices that can be controlled as a result of these range limitations and/or phone limitations. In a bridge-based lighting system, these groups are normally created manually, but could also be created automatically in the commissioning phase, e.g. as disclosed in US 2019/116645 A1.

US 2019/116645 A1 discloses a method of automatically commissioning a lighting system. The method comprises receiving signals from a positioning system that indicate a respective location at which each of a plurality of physical entities is detected by the positioning system, each of the entities being a person or a movable nonhuman object. The method further comprises determining a spatial distribution of at least some of the entities based on the locations indicated by the signals from the positioning system and determining a region corresponding to this spatial distribution. The method then comprises identifying a group of the luminaires that are arranged to illuminate the determined region and storing identifiers of those luminaires together as a group in a commissioning database.

If a wireless lighting system would be able to work both with a bridge present and without a bridge present, a user could first buy one or more lighting devices without a bridge and control them directly with this mobile device, thereby reducing the initial investment, and then later add a bridge to get access to improved features like out-of-home control, entertainment streaming, geofencing, extended number of lamps, and sensor automation.

However, manually creating groups of lighting devices for an already commissioned, larger wireless lighting system might require quite some effort from the user. The user would need to manually start creating and selecting e.g. rooms and moving each lamp to the correct location. This is time consuming and can even be error prone as the lighting devices might not always have clearly identifiable information. This might also be frustrating for the user, as users might consider that the lamps are already somehow grouped (though via a different convention), so if they get asked to create those groups after adding a bridge, it might feel like double work.

The method of automatically creating groups described in US 2019/116645 A1, which is applied in the commissioning phase, is only able to automatically create a limited set of groups.

SUMMARY OF THE INVENTION

It is a first object of the invention to provide a system, which is able to automatically configure a bridge with one or more groups of lighting devices in a wireless lighting system which has been commissioned.

It is a second object of the invention to provide a method, which is able to automatically configure a bridge with one or more groups of lighting devices in a wireless lighting system which has been commissioned.

In a first aspect of the invention, a system for configuring a bridge in a wireless lighting system which has been commissioned, said wireless lighting system comprising a plurality of lighting devices, comprises at least one input interface, at least one configuration interface, and at least one processor configured to use said at least one input interface to determine that a bridge has been added to said wireless lighting system, use said at least one input interface to obtain information relating to said plurality of lighting devices, analyze said information, determine one or more groups of lighting devices based on said analysis, at least one of said one or more groups comprising multiple of said plurality of lighting devices, and use said at least one configuration interface to configure said bridge with said determined one or more groups upon determining that said bridge has been added to said wireless lighting system.

At a moment before said bridge has been added to said wireless lighting system, said plurality of lighting devices is not connected to said bridge but is controllable in said commissioned wireless lighting system without said bridge. A group may correspond to a room, a collection of rooms, or a zone within a room, for example. If it is not possible to include a certain lighting device in a group of multiple lighting devices, this lighting device may be included in a group by itself.

By obtaining and analyzing information relating to the lighting devices in an already commissioned wireless lighting system, groups may automatically be created that are similar to, if not the same as, the groups that a user would create manually. Automatically created groups may be similar to, rather than the same as, manually created groups, because the system may not be able to obtain all information that the user has or use the same logic. By configuring the bridge with these automatically created groups, an easy migration path from a bridgeless mode to a bridge mode may be offered. The number of steps that are needed in this migration path is reduced by looking at parameters from which grouping can be inferred. As a result, the lighting devices of the plurality of lighting devices that were controlled simultaneously in the commissioned wireless lighting system prior to the bridge having been configured can continue to be controlled simultaneously once the bridge has been configured, but now more easily, i.e. as a group.

The migration from the bridgeless mode to the bridge mode may be implemented by simply extending the current commissioning, thereby leaving the lighting system largely unchanged, but is preferably implemented by re-commissioning the lighting system while re-using at least some of the information relating to the lighting devices (e.g. in order to automatically create one or more groups). The lighting system may be re-commissioned into the bridge, for example.

Said at least one processor may be configured to determine that said bridge has been added to said wireless lighting system upon receiving user input indicating that said bridge has been added to said wireless lighting system and/or upon receiving a wireless communication from said bridge. If the system that comprises said at least one processor is a bridge, said at least one processor may be configured to determine that said bridge has been added to said wireless lighting system upon receiving a wireless communication from a device in said wireless lighting system.

Said wireless lighting system may comprise one or more sensor and/or control devices and said at least one group may comprise at least one of said one or more sensor and/or control devices. This allows the user to see which sensor and/or control device belongs to which group, e.g. room. This may make it easier for the user to associate sensor and/or control devices with lighting devices, for example.

A device may be part of a plurality of groups. This allows a user to control one group of multiple devices at a first moment and another group of multiple devices at another moment, depending on his activities and/or preferences.

Said one or more groups of lighting devices may comprise a first group of lighting devices and a second group of lighting devices, said second group being a subgroup of said first group and comprising multiple of said plurality of lighting devices. This hierarchical ordering is especially advantageous if lighting devices each participate in multiple light scenes and the grouping is performed based on scene information.

Said at least one processor may be configured to analyze said information by determining which of said plurality of lighting devices are configured to take part in a same scene or routine. Said multiple lighting devices in said at least one group may then be ones configured to take part in a same scene or routine. Scenes are used often and are a good indicator of which lighting devices a user might want to control simultaneously.

Said at least one processor may be configured to analyze said information by determining which of said plurality of lighting devices are excluded from a same scene or routine. Said multiple lighting devices in said at least one group may then be ones excluded from a same scene or routine. Scenes are used often and exclusion from a scene or routine may be a good grouping indicator if the number of lighting devices in the lighting system is not too large.

Said at least one processor may be configured to analyze said information by determining which of said plurality of lighting devices have a same or similar type and/or have same or similar light capabilities, e.g. capabilities like color, brightness and/or beam angle. Said multiple lighting devices in said at least one group may then be ones having a same or similar type and/or having same or similar light capabilities. Lighting devices of a same or similar type and/or with same or similar capabilities, e.g. RGB LED spots, are more likely to be controlled by a user simultaneously.

Said at least one processor may be configured to analyze said information by determining which of said plurality of lighting devices have a similar name. Said multiple lighting devices in said at least one group may then be ones having a similar name. If a user has given lighting devices similar names, this is frequently an indication that he may want to control them simultaneously.

Said at least one processor may be configured to analyze said information by determining which of said plurality of lighting devices are controlled by a same control device and/or are controlled based on sensor data from a same sensor device. Said multiple lighting devices may then be ones controlled by a same control device and/or controlled based on sensor data from a same sensor device. If a user configures a lighting system to control multiple lighting devices simultaneously based on interaction with a control device or based on sensor data from a sensor device, this is often a good indicator that the user might want to control these lighting devices simultaneously manually as well.

Said at least one processor is configured to analyze said information by determining which of said plurality of lighting devices are controlled at similar times. Said multiple lighting devices may then be ones controlled at similar times. If lighting devices are controlled at similar times, it is likely that it will be beneficial to groups these lighting devices.

Said information relating to said plurality of lighting devices may comprise characteristics of wireless signals received by said plurality of lighting devices said at least one processor may be configured to analyze said information by analyzing said characteristics. This may make it possible to determine which lighting devices are likely located in the same room, for example. A group may be formed based on this information or lighting devices may be removed from a candidate group based on this information, for example.

In a second aspect of the invention, a method of configuring a bridge in a wireless lighting system which has been commissioned, said wireless lighting system comprising a plurality of lighting devices, comprises determining that a bridge has been added to said wireless lighting system, obtaining information relating to said plurality of lighting devices, analyzing said information, determining one or more groups of lighting devices based on said analysis, at least one of said one or more groups comprising multiple of said plurality of lighting devices, and configuring said bridge with said determined one or more groups upon determining that said bridge has been added to said wireless lighting system. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for configuring a bridge in a wireless lighting system which has been commissioned, said wireless lighting system comprising a plurality of lighting devices.

The executable operations comprise determining that a bridge has been added to said wireless lighting system, obtaining information relating to said plurality of lighting devices, analyzing said information, determining one or more groups of lighting devices based on said analysis, at least one of said one or more groups comprising multiple of said plurality of lighting devices, and configuring said bridge with said determined one or more groups upon determining that said bridge has been added to said wireless lighting system.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
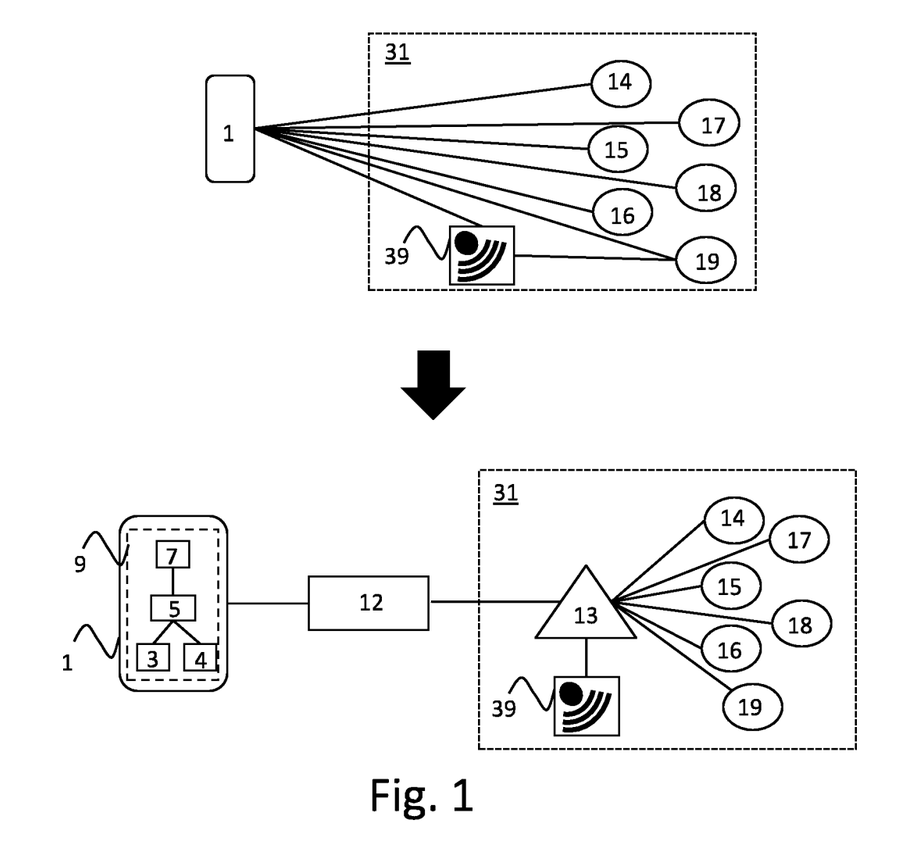
FIG. 1 shows a first embodiment of the system and shows a bridge being added to a wireless lighting system which has been commissioned.

FIG. 1 shows a first embodiment of the system for configuring a bridge in a wireless lighting system which has already been commissioned. The wireless lighting system 31 initially comprises lighting devices 14-19, e.g. Philips Hue lamps, and a sensor device 39, e.g. a presence sensor. The wireless lighting system 31 initially operates in a bridgeless mode and the lighting devices 14-19 can therefore be controlled directly with the mobile device 1, e.g. via Bluetooth. The sensor device 39 has been configured with the mobile device 1 to trigger activation of the light source of the lighting device 19, e.g. via Bluetooth.

While the commissioned wireless lighting system 31 operates in the bridgeless mode, the user may be informed of the benefits of upgrading towards the bridge. If interested, the user needs to only procure a bridge and go through a migration process where the lighting devices get commissioned to the bridge and from there onwards, control happens via the bridge.

The wireless lighting system 31 is then extended with a bridge 13, e.g. a Philips Hue bridge. The bridge 13 is connected to a wireless LAN access point 12, e.g. via Ethernet. The mobile device 1 is also connected to the wireless LAN access point 12, e.g. via Wi-Fi. After the bridge 13 has been added to the wireless lighting system 31, the lighting devices 14-19 can be controlled via the bridge 13. The bridge 13 communicates with the light devices 14-19, e.g. using Zigbee technology.

In the embodiment of FIG. 1, the system is the mobile device 1. The mobile device 1 comprises a receiver 3, a transmitter 4, a processor 5, memory 7 and a display 9. The processor 5 is configured to use the receiver 3 to determine that the bridge 13 has been added to the wireless lighting system 31 and use the receiver 3 to obtain information relating to the lighting devices 14-19.

The processor 5 is further configured to analyze the information and determine one or more groups of lighting devices based on the analysis such that the at least one of the one or more groups comprises multiple of the lighting devices 14-19. The processor 5 is further configured to use the transmitter 4 to configure the bridge 13 with the determined one or more groups upon determining that the bridge 13 has been added to the wireless lighting system 31.

Thus, at a moment before the bridge 13 has been added to the wireless lighting system 31, the plurality of lighting devices 14-19 is not connected to the bridge 13 but is controllable in the commissioned wireless lighting system 31 without the bridge 13. This is also referred to as bridgeless mode in this specification. When the bridge 13 is added, one or more of the lighting devices 14-19 are migrated to bridge mode. The one or more groups may correspond to one or more rooms in a home or office.

In an embodiment, the system determines that scenes are the key parameter indicative of grouping. In this case, the system may assume that all lighting devices participating in a scene when in bridgeless mode must be physically in the same area (this typically excludes scenes which only turn a light source off). In migration mode, the system looks at which scenes exist in all the migrating lighting devices and determines groups, e.g. room associations, based on them.

If the user has had a "basic" setup of the lighting system, most likely all lighting devices are part of all scenes. For example, if the user has lighting devices 14-17 and all are part of the two available scenes: Aurora and Rainbow. Then, in migration mode, the system determines that lighting devices 14-17 should be allocated to a single group/room (later to be customized by the user).

However, the user may not use a "basic" setup of the lighting system, but may instead have split the scenes as follows:

Aurora for lighting devices 14 and 15

Rainbow for lighting devices 16 and 17

The system may then determine that lighting devices 14 and 15 should be allocated to a different group/room than lighting devices 16 and 17, as the differences in scenes can be an indication that they are not used simultaneously, which is more likely to happen if they are placed in different rooms.

Not only one or more of the lighting devices 14-19 may be allocated to the one or more groups, but also the sensor device 39. Furthermore, also one or more control devices (not shown) may be allocated to the one or more groups. A device may be allocated to multiple groups. For example, the one or more groups of lighting devices may comprise a first group of lighting devices and a second group of lighting devices and the second group may be a subgroup of the first group.

For example, the user may have defined the following scenes in bridgeless mode:

Aurora for lighting devices 14,15,18, and 19

Rainbow for lighting devices 16 and 17

Spring for lighting devices 18 and 19

The system may notice that there is a partial overlap. The system may then decide to create an overarching group for lighting devices 14,15,18, and 19 and create a smaller group for lighting devices 18 and 19 which hierarchically depends on the overarching group. For example, lighting devices 14,15,18, and 19 may be allocated to a living room group, while lighting devices 18 and 19 may be allocated to a subgroup. Such a partial overlap is expected to be relatively large in bridgeless mode, as there will typically be no limit or a large limit on the number of scenes that a user can define in this mode.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example.

The receiver 3 and the transmitter 4 may use one or more wireless communication technologies such as Wi-Fi (IEEE 802.11) to communicate with the wireless LAN access point 12, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may further comprise a camera (not shown). This camera may comprise a CMOS or CCD sensor, for example. The mobile device 1 may comprise other components typical for a mobile device such as a battery and a power connector. The invention may be implemented using a computer program running on one or more processors.

In the embodiment of FIG. 1, the system is a mobile device. In an alternative embodiment, the system of the invention is a different device, e.g. a bridge, or comprises a plurality of devices.

Figure 2:
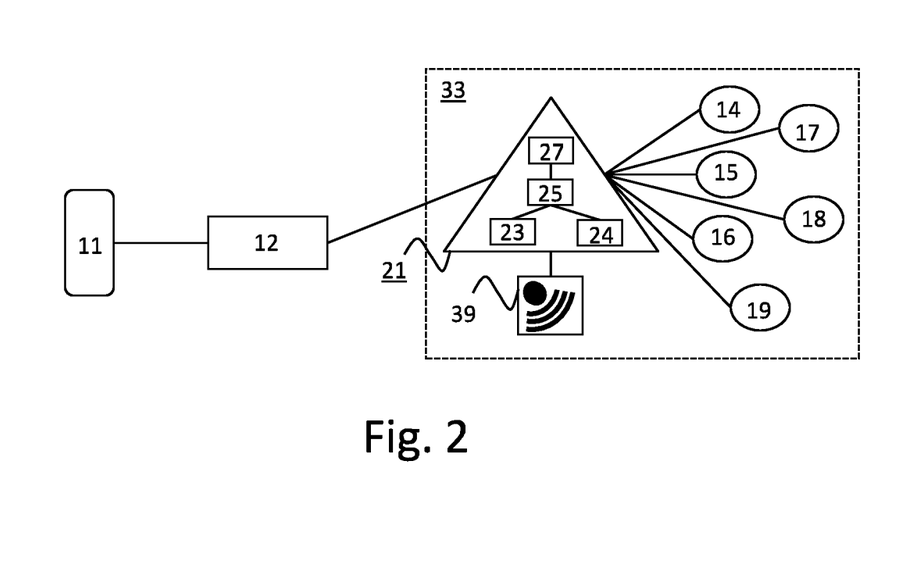
FIG. 2 shows a second embodiment of the system.

FIG. 2 shows a second embodiment of the system of the invention: a bridge 21, e.g. a Philips Hue bridge. The bridge 21 is added to a wireless lighting system 33, which has been commissioned and which comprises the lighting devices 14-19 and the sensor device 39. The lighting devices 14-19 can be controlled with a mobile device 11, first directly (in bridgeless mode) and then via the bridge 21 (in bridge mode). The bridge 21 comprises a receiver 23, a transmitter 24, a processor 25, and a memory 27. The processor 25 is configured to use the receiver 23 to determine that the bridge 21 has been added to the wireless lighting system 33 and use the receiver 23 to obtain information relating to the lighting devices.

The processor 25 is further configured to analyze the information, determine one or more groups of lighting devices based on the analysis such that at least one of the one or more groups comprises multiple of the lighting devices 14-19. The processor 25 is further configured to use an internal interface to configure the bridge 21 with the determined one or more groups upon determining that the bridge 21 has been added to the wireless lighting system 33. The processor 25 may be configured to determine that the bridge 21 has been added to the wireless lighting system 33 when it receives a wireless communication from at least one of the lighting devices 14-19 and/or from the mobile device 11 (e.g. in response to user input on the mobile device 11).

In the embodiment of the bridge 21 shown in FIG. 2, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The memory 27 may comprise one or more memory units. The memory 27 may comprise one or more hard disks and/or solid-state memory, for example. The memory 27 may be used to store a table of connected lights, for example.

The receiver 23 and the transmitter 24 may use one or more wired or wireless communication technologies such as Ethernet to communicate with the wireless LAN access point 12, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The bridge 21 may comprise other components typical for a network device such as a power connector. The invention may be implemented using a computer program running on one or more processors.

Figure 3:
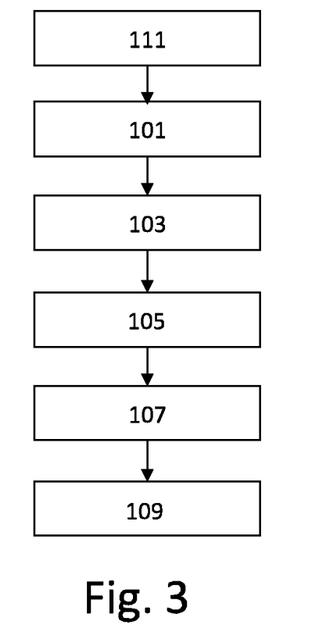
FIG. 3 is a flow diagram of a first embodiment of the method.

A first embodiment of the method of configuring a bridge in a wireless lighting system which has been commissioned is shown in FIG. 3. The wireless lighting system comprises a plurality of lighting devices. A step 111 comprises receiving user input indicating that the bridge has been added to the wireless lighting system. A step 101 comprises determining that the bridge has been added to the wireless lighting system upon receiving the user input in step 111.

A step 103 comprises obtaining information relating to the plurality of lighting devices. A step 105 comprises analyzing the information. A step 107 comprises determining one or more groups of lighting devices based on the analysis. At least one of the one or more groups comprises multiple of the plurality of lighting devices. A step 109 comprises configuring the bridge with the determined one or more groups upon determining that the bridge has been added to the wireless lighting system.

Figure 4:
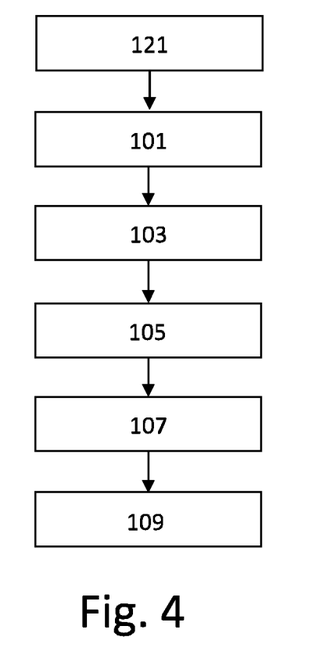
FIG. 4 is a flow diagram of a second embodiment of the method.

A second embodiment of the method of configuring a bridge in a wireless lighting system is shown in FIG. 4. In the embodiment of FIG. 4, step 111 of FIG. 3 has been replaced with a step 121. Step 121 comprises receiving a wireless communication from the bridge. Step 101 comprises determining that the bridge has been added to the wireless lighting system upon receiving the wireless communication from the bridge in step 121. Next, steps 103 to 109 of FIG. 3 are performed.

Figure 5:
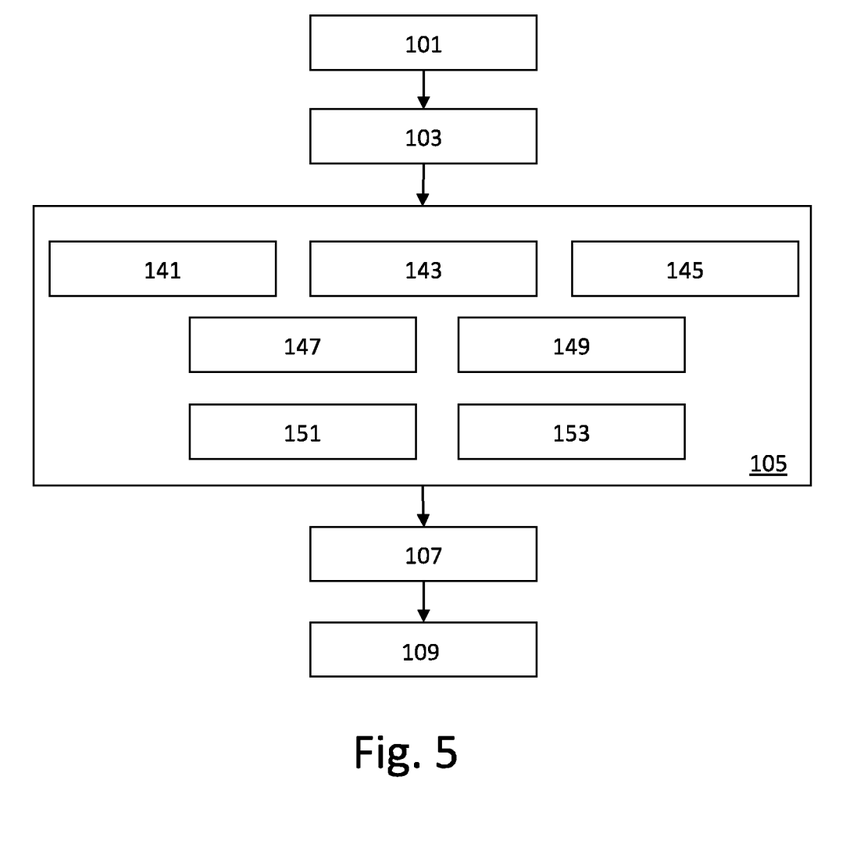
FIG. 5 is a flow diagram of a third embodiment of the method.

A third embodiment of the method of configuring a bridge in a wireless lighting system which has been commissioned is shown in FIG. 5. The third embodiment of the method comprises steps 101-109 of FIGS. 3 and 4 and step 105 comprises one or more of sub steps 141-153.

Step 141 comprises determining which of the plurality of lighting devices are configured to take part in a same scene or routine. If multiple lighting devices are configured to take part in a same scene or routine, they may be included in the same group, as also described in relation to FIG. 1.

Dynamic light settings stored/used in lighting devices may be considered when determining the grouping. Dynamic light settings may specify how light effects are determined from music content in order to have the colors of lighting devices change with the rhythm of the music content. Different applications might be chosen for different rooms, like smooth effects for a dining room and active and fast transitions for a living room. The dynamic light settings may be specified in a scene or routine, but they may also be independent from a scene or routine.

Step 143 comprises determining which of the plurality of lighting devices are excluded from a same scene or routine. If multiple lighting devices are excluded from a same scene or routine, they may be included in the same group, as a lack of action can also be an indirect indication of grouping. For example, the user might want to have a go-to-bed schedule which automatically turns off all lights except for the two nightstand lamps in the bedroom. Therefore, although the action is taking place on the remaining lights, the fact that these two lamps are not affected could be an indication that they belong together.

Step 145 comprises determining which of the plurality of lighting devices have a same or similar type and/or have same or similar light capabilities. If multiple lighting devices have a same or similar type and/or have same or similar light capabilities, they may be included in the same group. As an example of the former, spots and downlighters are most commonly used in large quantities in applications (at least as opposed to e.g. hanging luminaires, A19 bulbs, and light strips). Next to type, color capabilities may also be an indication of grouping, as it is more likely that lights with similar capabilities are used in the same spaces. For example, it is likely that all five spots in a lighting system are co-located. However, if it turns out that three are color spots and the other two are white only, the five spots may not be included in the same group if other groupings seem like a better fit.

Step 147 comprises determining which of the plurality of lighting devices have a similar name. If multiple lighting devices have a similar name, they may be included in the same group. For example, lighting devices with names "dining table 1" and "dining table 2" could be allocated to a first group and a lighting device with name "bathroom ceiling" could be allocated to different group.

Step 149 comprises determining which of the plurality of lighting devices are controlled by a same control device and/or are controlled based on sensor data from a same sensor device. If multiple lighting devices are controlled by a same control device and/or are controlled based on sensor data from a same sensor device, they may be included in the same group. Sensor devices and control devices are also referred to as accessories. A control device may be a (wireless) light switch, for example.

It may be possible to request the lighting devices to provide information about recent devices they have interacted with in some way. Information on which accessories trigger a specific light setting via their issued commands might not get stored in the lighting devices as a scene but could still be a valuable grouping indication. For example, lighting devices 14, 15, 18 and 19 of FIG. 1 could have been triggered regularly by the sensor device 39 of FIG. 1, lighting devices 18 and 19 could (additionally) have been controlled with a light switch (not shown in FIG. 1), and lighting devices 16 and 17 of FIG. 1 could have been controlled only via the app on mobile device 1 of FIG. 1. Alternatively, it may be possible to obtain this information from the sensor device(s) and/or from the user control device(s) that the lighting devices interact with.

Step 151 comprises determining which of the plurality of lighting devices are controlled at similar times. If multiple lighting devices are controlled at similar times, they may be included in the same group. For example, the granularity/frequency of the control can help to further confirm a hierarchical grouping determined based on other information.

Step 153 comprises analyzing characteristics of wireless signals received by the plurality of lighting devices (obtained in step 103). For example, lighting devices can keep track of received messages from neighboring lighting devices and use e.g. RSSI and/or frequency of commands as a further indication of grouping. This could help distinguish lighting devices in neighboring rooms, as walls can attenuate signals in a potentially more noticeable way than distance within a same room.

If more than one of sub steps 141-153 is performed, each part of the obtained information may be used to rate whether a device should be included in a candidate group. After all information has been processed, final groups may be determined by determining which candidate groups have at least two devices whose rating for that group exceeds the inclusion threshold.

For example, if three lighting devices participate in the same scene, a candidate group may be created, and an initial rating may be given to the three lighting devices that exceeds an inclusion threshold. If one of these three devices then appears to be located in a neighboring room, its rating may be lowered, e.g. below the inclusion threshold. If two other lighting devices have similar names, a further candidate group may be created, and an initial rating may be given to the two lighting devices that exceeds the inclusion threshold.

In the embodiment of FIG. 5, steps 111 and 121 of FIGS. 3 and 4, respectively, are absent. In an alternative embodiment, step 111 and/or step 121 is/are performed before step 101 of FIG. 5.

Figure 6:
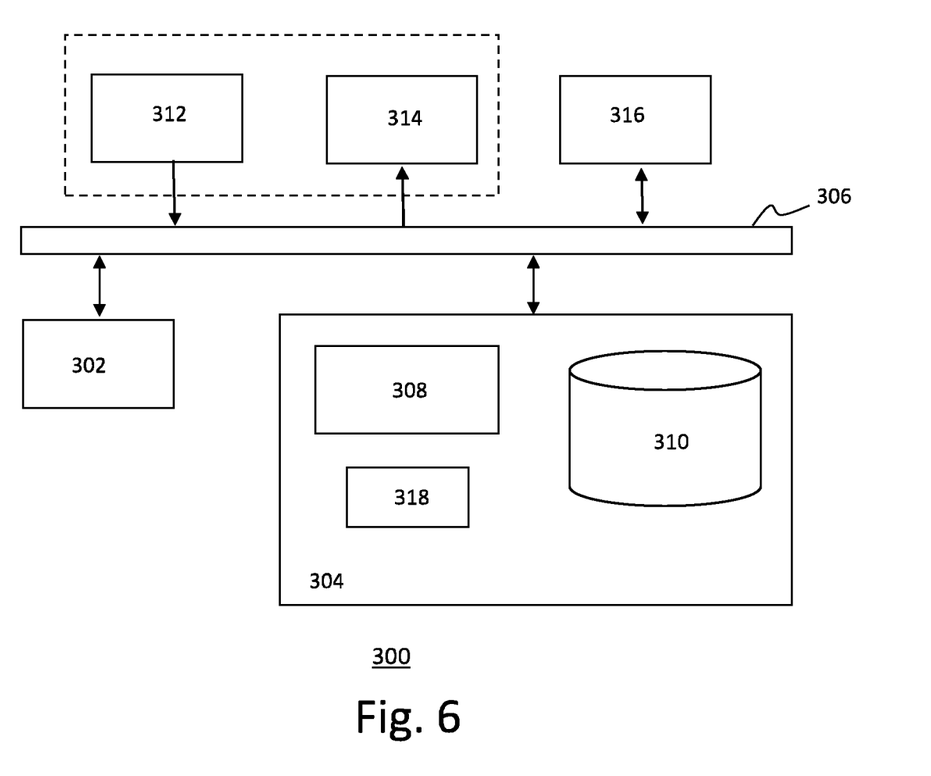
FIG. 6 is a block diagram of an exemplary data processing system for performing the method of the invention.

FIG. 6 depicts a block diagram illustrating an exemplary data processing system that may perform the method as described with reference to FIGS. 3 to 5.

As shown in FIG. 6, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 6 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 6, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 6) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for configuring a bridge in a wireless lighting system which has been commissioned in a bridgeless mode, said wireless lighting system comprising a plurality of lighting devices, said system comprising:
   at least one input interface;
   at least one configuration interface; and
   at least one processor configured to:
      use said at least one input interface to determine that a bridge has been added to said wireless lighting system,
      use said at least one input interface to obtain information relating to said plurality of lighting devices,
      analyze said information,
      determine one or more groups of lighting devices based on said analysis, at least one of said one or more groups comprising multiple of said plurality of lighting devices, and, upon determining that said bridge has been added to said wireless lighting system,
      migrate said wireless lighting system from the bridgeless mode to a bridge mode by configuring, using said at least one configuration interface, said bridge with said determined one or more groups, such that lighting devices of the plurality of lighting devices that were controlled simultaneously in said bridgeless mode continue to be controlled simultaneously as a group of said one or more groups in said bridge mode.

2. A system as claimed in claim 1, wherein said at least one processor is configured to determine that said bridge has been added to said wireless lighting system upon receiving user input indicating that said bridge has been added to said wireless lighting system.

3. A system as claimed in claim 1, wherein said at least one processor is configured to determine that said bridge has been added to said wireless lighting system upon receiving a wireless communication from said bridge.

4. A system as claimed in claim 1, wherein said wireless lighting system comprises one or more sensor and/or control devices and said at least one group comprises at least one of said one or more sensor and/or control devices.

5. A system as claimed in claim 1, wherein said one or more groups of lighting devices comprises a first group of lighting devices and a second group of lighting devices, said second group being a subgroup of said first group and comprising multiple of said plurality of lighting devices.

6. A system as claimed in claim 1, wherein said at least one processor is configured to analyze said information by determining which of said plurality of lighting devices are configured to take part in a same scene or routine and said multiple lighting devices in said at least one group are configured to take part in a same scene or routine.

7. A system as claimed in claim 1, wherein said at least one processor is configured to analyze said information by determining which of said plurality of lighting devices are excluded from a same scene or routine and said multiple lighting devices in said at least one group are excluded from a same scene or routine.

8. A system as claimed in claim 1, wherein said at least one processor is configured to analyze said information by determining which of said plurality of lighting devices have a same or similar type and/or have same or similar light capabilities and said multiple lighting devices in said at least one group have a same or similar type and/or have same or similar light capabilities.

9. A system as claimed in claim 1, wherein said at least one processor is configured to analyze said information by determining which of said plurality of lighting devices have a similar name and said multiple lighting devices in said at least one group have a similar name.

10. A system as claimed in claim 1, wherein said at least one processor is configured to analyze said information by determining which of said plurality of lighting devices are controlled by a same control device and/or are controlled based on sensor data from a same sensor device and said multiple lighting devices are controlled by a same control device and/or are controlled based on sensor data from a same sensor device.

11. A system as claimed in claim 1, wherein said at least one processor is configured to analyze said information by determining which of said plurality of lighting devices are controlled at similar times and said multiple lighting devices are controlled at similar times.

12. A system as claimed in claim 1, wherein said information relating to said plurality of lighting devices comprises characteristics of wireless signals received by said plurality of lighting devices said at least one processor is configured to analyze said information by analyzing said characteristics.

13. A method of configuring a bridge in a wireless lighting system which has been commissioned in a bridgeless mode, said wireless lighting system comprising a plurality of lighting devices, said method comprising:
  determining that a bridge has been added to said wireless lighting system;
  obtaining information relating to said plurality of lighting devices;
  analyzing said information,
  determining one or more groups of lighting devices based on said analysis, at least one of said one or more groups comprising multiple of said plurality of lighting devices; and
  upon determining that said bridge has been added to said wireless lighting system,
  migrating said wireless lighting system from the bridgeless mode to a bridge mode by configuring said bridge with said determined one or more groups, such that lighting devices of the plurality of lighting devices that were controlled simultaneously in said bridgeless mode continue to be controlled simultaneously as a group of said one or more groups in said bridge mode.

14. A non-transitory computer program or suite of computer programs comprising at least one software code portion or a computer program product storing at least one software code portion, the software code portion, when run on a computer, causes the computer to carry out the method of claim 13.

\* \* \* \* \*